US007513729B2

(12) United States Patent
Kepplinger et al.

(10) Patent No.: US 7,513,729 B2
(45) Date of Patent: Apr. 7, 2009

(54) METHOD AND DEVICE FOR DISTRIBUTING A LUMPY BULK MATERIAL

(75) Inventors: Leopold Werner Kepplinger, Leonding (AT); Johann Wurm, Bad Zell (AT); Franz Berner, Asten (AT)

(73) Assignee: Voest-Alpine Industrieanlagenbau GmbH & Co. (AT)

( * ) Notice: Subject to any disclaimer, the term of this patent is extended or adjusted under 35 U.S.C. 154(b) by 258 days.

(21) Appl. No.: 11/393,970

(22) Filed: Mar. 30, 2006

(65) Prior Publication Data

US 2006/0182555 A1 Aug. 17, 2006

Related U.S. Application Data

(62) Division of application No. 10/380,941, filed on Jun. 23, 2003, now Pat. No. 7,059,818.

(51) Int. Cl.
*B65G 11/00* (2006.01)

(52) U.S. Cl. ....................... 414/299; 414/162; 414/199; 414/208; 198/640

(58) Field of Classification Search ................. 414/162, 414/205-207, 299-302, 804, 808, 199, 208; 193/2 R, 27, 32, 33, 34, 46; 198/640
See application file for complete search history.

(56) References Cited

U.S. PATENT DOCUMENTS 1,988,676 A * 1/1935 Arno .......................... 198/540
2,246,723 A * 6/1941 Delivuk ....................... 209/147
2,318,881 A * 5/1943 Elias .......................... 198/525
2,646,407 A * 7/1953 Lassiat et al. ................. 502/47
RE23,825 E * 5/1954 Clark et al. ................. 425/222
2,837,194 A * 6/1958 Ross ........................... 193/32
3,885,684 A * 5/1975 Mitchell ..................... 414/301

(Continued)

FOREIGN PATENT DOCUMENTS

DE 2335681 * 1/1975

(Continued)

OTHER PUBLICATIONS

International Search Report.

*Primary Examiner*—James Keenan
(74) *Attorney, Agent, or Firm*—Ostrolenk, Faber, Gerb & Soffen, LLP

(57) ABSTRACT

The invention relates to an apparatus and a process for distributing a lumpy bulk material, in particular iron ore which has been at least partially prereduced, onto an extensive surface, in particular onto a fixed bed, this surface extending within a reactor or vessel used in physical or chemical process technology, in particular in a reactor used in a metallurgical plant to produce pig iron or primary steel products, and the lumpy bulk material being charged via at least one charging apparatus, which has at least two, in particular rotationally symmetrical, chutes, which are preferably arranged at the same distance from the vertical longitudinal axis of the reactor. In this arrangement, at least a proportion of the bulk material, in particular after it has been introduced into the chute, before it comes into contact with the extensive surface, is distributed in the radial and/or tangential direction—as seen from above—at a scattering device which is assigned to at least one of the chutes and is preferably in the chute.

2 Claims, 3 Drawing Sheets

U.S. PATENT DOCUMENTS

Figure 1:
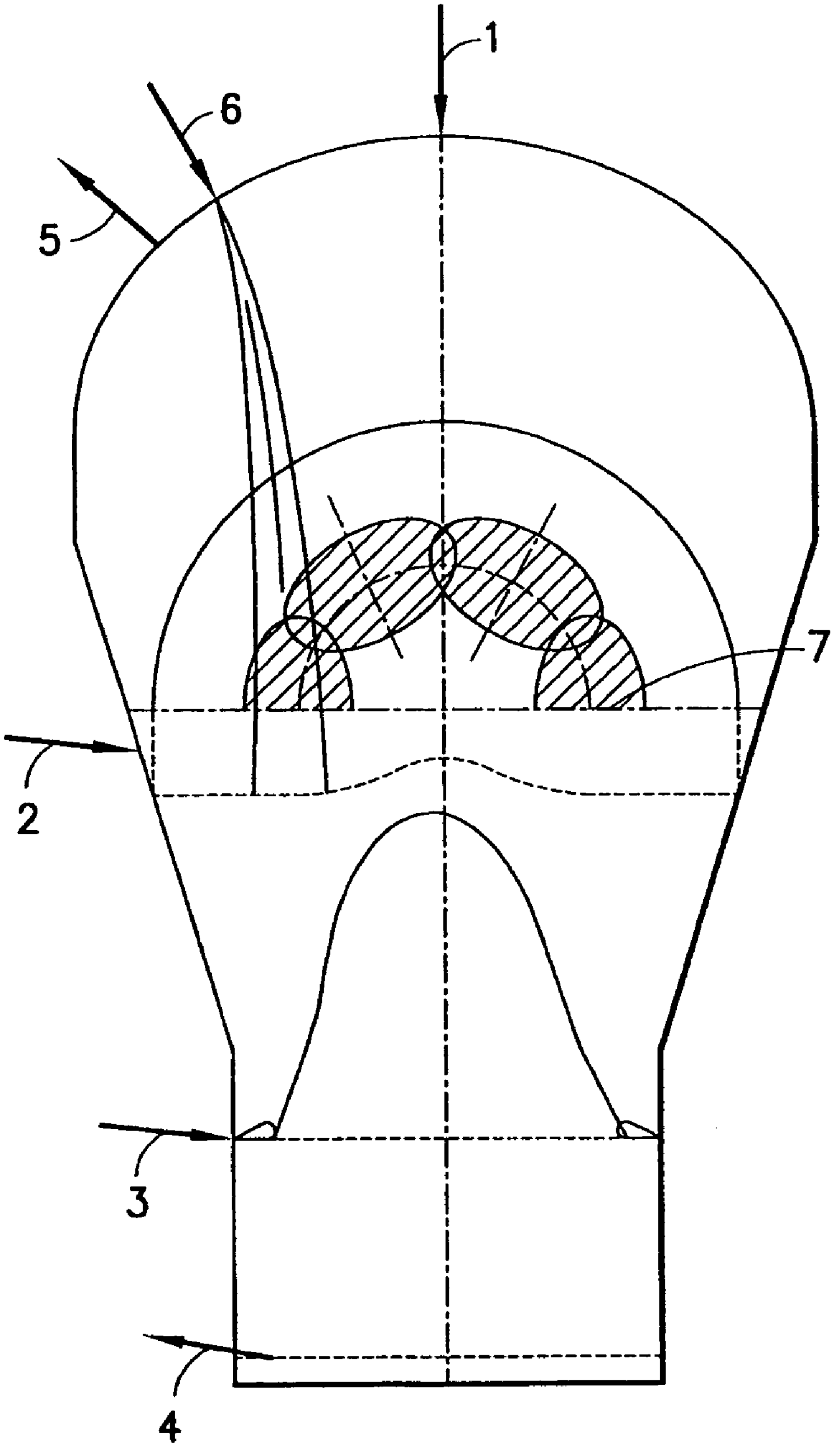

| | | | | | |
|---|---|---|---|---|---|
| 4,029,220 | A | * | 6/1977 | Greaves | 414/206 |
| 4,040,529 | A | * | 8/1977 | Wurdeman et al. | 414/301 |
| 4,040,530 | A | * | 8/1977 | Mahr et al. | 414/208 |
| 4,243,351 | A | | 1/1981 | Legille et al. | 414/206 |
| 4,411,578 | A | * | 10/1983 | Morrow, Jr. | 414/300 |
| 4,478,300 | A | * | 10/1984 | Mikami | 177/59 |
| 4,497,609 | A | | 2/1985 | Santén | 414/786 |
| 4,547,985 | A | * | 10/1985 | Silins et al. | 37/444 |
| 5,022,806 | A | * | 6/1991 | Lonardi et al. | 414/208 |
| 5,413,537 | A | * | 5/1995 | Hume | 474/154 |
| 5,836,362 | A | * | 11/1998 | Ackley et al. | 141/286 |
| 6,443,193 | B1 | * | 9/2002 | Blasco | 141/286 |
| 6,471,029 | B1 | * | 10/2002 | Pierce | 193/14 |

FOREIGN PATENT DOCUMENTS

| | | |
|---|---|---|
| DE | 29515419 | 11/1995 |
| DE | 19929180 | 1/2001 |
| FR | 1197358 | 11/1959 |
| FR | 1266362 | 7/1961 |
| FR | 1367391 | 7/1964 |
| JP | 59104406 | 6/1984 |

* cited by examiner

METHOD AND DEVICE FOR DISTRIBUTING A LUMPY BULK MATERIAL

CROSS REFERENCE TO RELATED APPLICATION

The present application is a divisional of U.S. patent application Ser. No. 10/380,941, filed Jun. 23, 2003, which is a 35 U.S.C. §371 national phase conversion of PCT/EP01/09852, filed Aug. 27, 2001, which claims the priority of Austrian Application No. A 1612/00, filed Sep. 22, 2000 in the names of Leopold Werner KEPPLINGER and Johann WURM and entitled METHOD AND DEVICE FOR DISTRIBUTING A LUMPY BULK MATERIAL, which are incorporated by reference. The PCT International Application was published in the German language.

BACKGROUND OF THE INVENTION

The invention relates to an apparatus and a process for distributing a lumpy bulk material, in particular iron ore which has been at least partially prereduced, onto an extensive surface, in particular onto a fixed bed, this surface extending within a reactor or vessel used in physical or chemical process technology, in particular in a reactor used in a metallurgical plant to produce pig iron or primary steel products, and the lumpy bulk material being charged via at least one charging apparatus, which has at least two, in particular rotationally symmetrical, chutes, which are preferably arranged at the same distance from the vertical longitudinal axis of the reactor.

The distribution of a lumpy bulk material on an extensive surface represents a problem which is known in plant construction and in process engineering. Particularly in the case of reactors used in chemical/physical process engineering, considerable efforts are being made to achieve a degree of distribution of the bulk material which is optimized for the particular process. Incorrect loading of a reactor of this type may lead to a reduction in the quality of the product produced and also to a significantly higher level of environmental pollution, for example caused by higher dust emissions. The productivity of an installation of this type is adversely affected as a result.

U.S. Pat. No. 4,497,609 describes an apparatus by means of which a stream of bulk material can be charged continuously into a shaft furnace. For this purpose, bulk material is charged on the periphery of the shaft furnace via a plurality of chutes.

In view of the prior art, it is an object of the present invention to further develop a process and an apparatus which distributes and scatters lumpy bulk material on an extensive surface, and compared to the prior art, lead to improved process management and a more economic configuration of the installation.

The present invention has proven particularly advantageous when used in a melter gasifier, and is documented in most detail in this respect. However, the use of the invention is not restricted to this embodiment, but rather the description of the operations which take place in a melter gasifier represents an explanation given by way of example. The uses of the invention in other metallurgical units, in particular a shaft furnace, form further concrete embodiments of the invention.

A melter gasifier is a unit for producing pig iron or primary steel products, as has long been known in the prior art.

The melter gasifier, as described in the prior art, is used to melt down a substantially prereduced iron ore (DRI), and to generate reduction gas from reduction-gas carriers, preferably lumpy coal.

The coal and the DRI are generally introduced into the melter gasifier via the dome of the latter, and it has proven expedient for the coal to be introduced centrally.

Accordingly, the DRI is introduced into the melter gasifier via one or more eccentrically located openings on the gasifier dome.

According to one embodiment of the process according to the invention for distributing a lumpy bulk material, in particular iron ore which has been at least partially prereduced, onto an extensive surface, in particular onto a fixed bed, this surface extending within a reactor or vessel used in physical or chemical process technology, in particular in a reactor used in a metallurgical plant to produce pig iron or primary steel products, and the lumpy bulk material being charged via at least one charging apparatus, which has at least two, in particular rotationally symmetrical, chutes, which are preferably arranged at the same distance from the vertical longitudinal axis of the reactor, in which process, furthermore, at least a proportion of the bulk material is distributed in the radial and/or tangential direction—as seen from above—at a scattering device.

According to a further feature of the process according to the invention, the bulk material is distributed at the scattering device at least partially inside the chute.

According to a further feature of the process according to the invention, the scattering areas of adjacent chutes overlap at least partially before the fixed bed is reached.

According to an additional feature of the process according to the invention, the overall scattering pattern of all the chutes as seen from above substantially forms a concentric ring.

The invention is also characterized by an apparatus according to the invention for distributing a lumpy bulk material, in particular iron sponge, from a flow of bulk material onto an extensive surface, in particular onto a fixed bed, this surface extending within a reactor used in physical or chemical process engineering, in particular within a reactor of a metallurgical plant for producing pig iron or primary steel products, preferably in a melter gasifier, and the lumpy bulk material being charged via a charging apparatus which has at least two, preferably rotationally symmetrical, chutes, and the charging apparatus furthermore has at least one additional scattering device for scattering the bulk material, by means of which at least a proportion of the bulk material can be distributed in the radial and/or tangential direction, as seen from above.

The distribution of a bulk material via a plurality of chutes or inclined tubes has long been known in process engineering, in particular in metallurgical technology.

The additional provision of a scattering device causes the bulk material, as it drops out of the chutes onto the surface, to be additionally scattered, or the streams of bulk material formed in this way to be widened.

According to a particularly preferred embodiment of the invention, the widened streams of bulk material overlap one another. This ensures in particular that, even in the event of a chute failing, for example as a result of becoming blocked, the fixed bed receives a substantially uniform feed of bulk material.

To achieve scattering which is as uniform as possible, distribution in the radial and tangential directions—as seen from above—is particularly suitable, although both radial distribution and tangential distribution used individually also lead to the flow of bulk material being widened and to the bulk material being scattered, although to a limited extent.

According to one feature of the invention, the chutes are arranged at the same distance from the longitudinal axis of the reactor.

Particularly preferably, the bulk material is in this case discharged onto the fixed bed at a plurality of points along an imaginary circle or ring, in which case, according to a further preferred embodiment, the individual flows of bulk material assigned to the chutes partially intersect one another. In this way, it is possible to compensate for the failure of one or more chutes during the charging of the fixed bed.

According to one feature of the invention, the scattering device is arranged in a rigid manner.

Particularly at relatively high temperatures, moveable devices, for example in relevant reactors used in metallurgical technology, have proven to be relatively unreliable. It is necessary to take particular protective measures (with regard to temperature, wear), which entail considerable costs.

By contrast, an immobile, i.e. rigid, apparatus is inexpensive and reliable.

According to a further feature of the invention, the scattering device is arranged so as to be moveable, but without a mechanical drive, in particular without any drive. In this case, according to a preferred embodiment of the invention, the scattering device is rigidly secured.

According to one feature of the invention, the scattering device is arranged inside the chute. This ensures that the scattering device is not exposed to the high temperature of the melter gasifier. In particular, in this case the high radiant heat as occurs in a melter gasifier, causing a high load on all the internal fittings, in the gas chamber is to be taken into account. Installing the scattering device in the chute means that the scattering device is effectively protected from these thermal or thermo-mechanical loads and achieves a long service life.

According to a further feature of the invention, the scattering device has a number of projections which are arranged on the inner side of the chute.

The projections cause the material in the chute to be decelerated and, in particular, be charged onto the fixed bed along a circular ring at a predetermined distance from the centre of the gasifier. According to a preferred embodiment, the wear-resistant projections are fitted in the lower part of the chute.

According to a further feature of the invention, the scattering device has a chain, preferably a round-link chain.

The chain represents a simple and inexpensive alternative allowing the material in the chute or inclined tube to be decelerated, and in this way allowing the desired charging along the circular ring to be produced. The chain is in this case made from heat-resistant and wear-resistant material.

According to a further additional feature, the chain, at predetermined intervals, which preferably vary with respect to one another, has a number of scattering elements, for example nodules.

This ensures that particularly uniform scattering is achieved.

The invention is also characterized by a scattering device according to the invention.

According to a particular embodiment, the scattering device has a number of chains, on each of which, in turn, a number of nodules are provided, and adjacent nodules are arranged at intervals which preferably differ from one another.

The scattering device according to the invention causes the bulk material to be decelerated and scattered, and in this way causes the resulting flow of bulk material which strikes the fixed bed to be widened.

A particular embodiment provides a device which is used to guide and scatter the bulk material, this device having a chute, and a number of projections being arranged on the inner side of the chute.

BRIEF DESCRIPTIONS OF THE DRAWINGS

Figure 2:
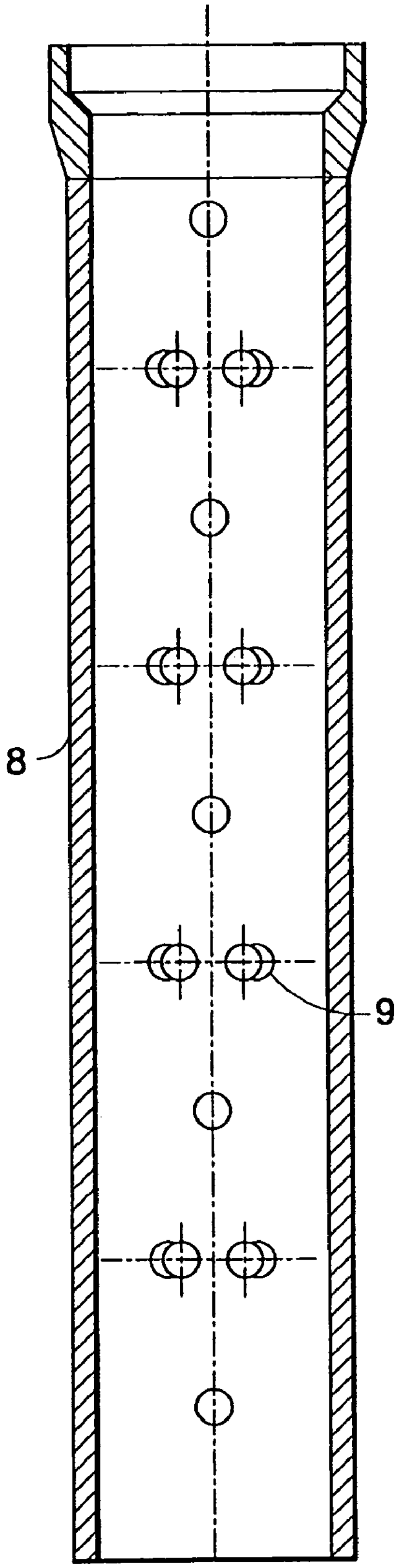
Figure 3:
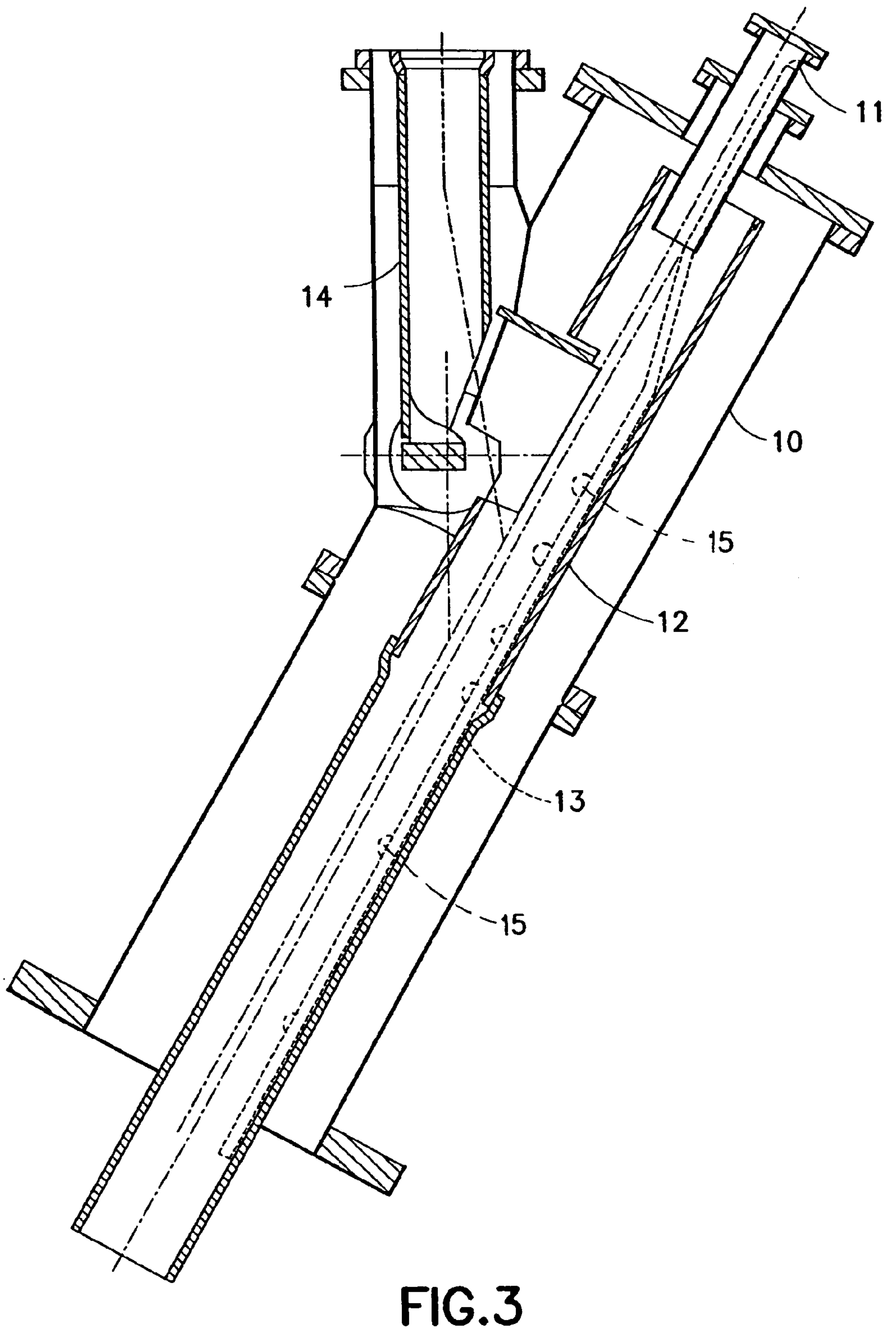

Non-restrictive exemplary embodiments of the invention will be explained in more detail below with reference to diagrammatic drawings, in which:

FIG. 1 diagrammatically depicts the DRI distribution in a melter gasifier,

FIG. 2 shows an exemplary embodiment of a device for combined guidance and scattering, FIG. 3 shows an exemplary embodiment of a scattering device. The DRI distribution in a melter gasifier is diagrammatically sketched in FIG. 1. In this case, the melter gasifier has feeds for coal 1, for DRI 6, for dust 2, for oxygen 3, as well as a slag and pig iron tap 4 and a gas discharge line 5 for discharging the reduction gas. Both the coal and the DRI are introduced continuously into the melter gasifier. The feed 6 for the DRI has six openings in the gasifier dome, which are arranged equidistantly from the coal-introduction means which is oriented along the longitudinal axis, and which are equipped with chutes or inclined downpipes. For the sake of clarity, in FIG. 1 a single feed 6 for DRI is illustrated and is intended to represent all the feeds 6 for DRI.

The DRI distribution in a melter gasifier is diagrammatically sketched in FIG. 1. In this case, the melter gasifier has feeds for coal 1, for DRI 6, for dust 2, for oxygen 3, as well as a slag and pig iron tap 4 and a gas discharge line 5 for discharging the reduction gas. Both the coal and the DRI are introduced continuously into the melter gasifier. The feed 6 for the DRI has six openings in the gasifier dome, which are arranged equidistantly from the coal-introduction means which is oriented along the longitudinal axis, and which are equipped with chutes or inclined downpipes. For the sake of clarity, in FIG. 1 a single feed 6 for DRI is illustrated and is intended to represent all the feeds 6 for DRI.

The DRI is distributed along an imaginary circle or ring onto the bed of the melter gasifier, without any DRI being charged into the centre. The distribution of the DRI is diagrammatically illustrated in FIG. 1, in which the DRI distribution 7 on the fixed bed is diagrammatically sketched. Accordingly, the scattering of the DRI in the chutes, compared to the prior art, results in an increase in the scattering radius of the DRI on the fixed bed, with the individual scattering areas partially overlapping one another. The scattering according to the invention leads to uniform distribution and, in particular, improved mixing of the DRI with the coal which is introduced.

FIG. 2 diagrammatically depicts a device according to the invention for guiding and scattering the DRI. This device is a chute 8, on the inner surface of which a plurality of projections 9 are arranged. If the DRI is passed through this chute, it is diverted and decelerated by the projections.

All parts of the apparatus presented here have to be adapted to the prevailing conditions in their particular area of use. When used in a melter gasifier, materials which withstand high temperatures and are wear-resistant are predominantly used. Furthermore, consideration may be given to providing those parts which are exposed to particularly high temperatures with a refractory lining.

Those parts of the apparatus illustrated here which experience has shown are exposed to particularly high levels of wear are additionally protected by reinforcements, for example by welded-on plates.

FIG. 3 shows an embodiment of a scattering device as is used, for example, in a melter gasifier for introducing the DRI onto the fixed bed. In this case, one or more chains 13 are arranged in a chute 10 by suitable securing means 11 in a protective pipe 12.

According to a preferred embodiment, the chains 13 have a plurality of nodules 15. In this case, the distances between the nodules 15 preferably vary. The bulk material which is introduced into the chute 10 via a feed line 14 is decelerated and scattered by the chains 13 and/or the nodules 15 of the chains 13.

What is claimed is:

1. A scattering device for use in an apparatus for distributing lumpy bulk material over an extensive surface in a reactor or vessel, wherein the scattering device comprises an inclined chute through which the lumpy material is introduced into the reactor or vessel and a plurality of chains arranged within the inclined chute by suitable securing means, wherein at least a portion of said chains extends through a protective pipe member located within said inclined chute, said scattering device adapted for contacting and for scattering the lumpy material being introduced into the reactor or vessel, and each said chain having a plurality of scattering nodules thereon spaced at intervals along the chain, such that the lumpy bulk material is charged at a predetermined distance from the center of the reactor or vessel.

2. The scattering device of claim 1, wherein the nodules are spaced at varying intervals along the chain.

* * * * *